No. 762,585. Patented June 14, 1904.

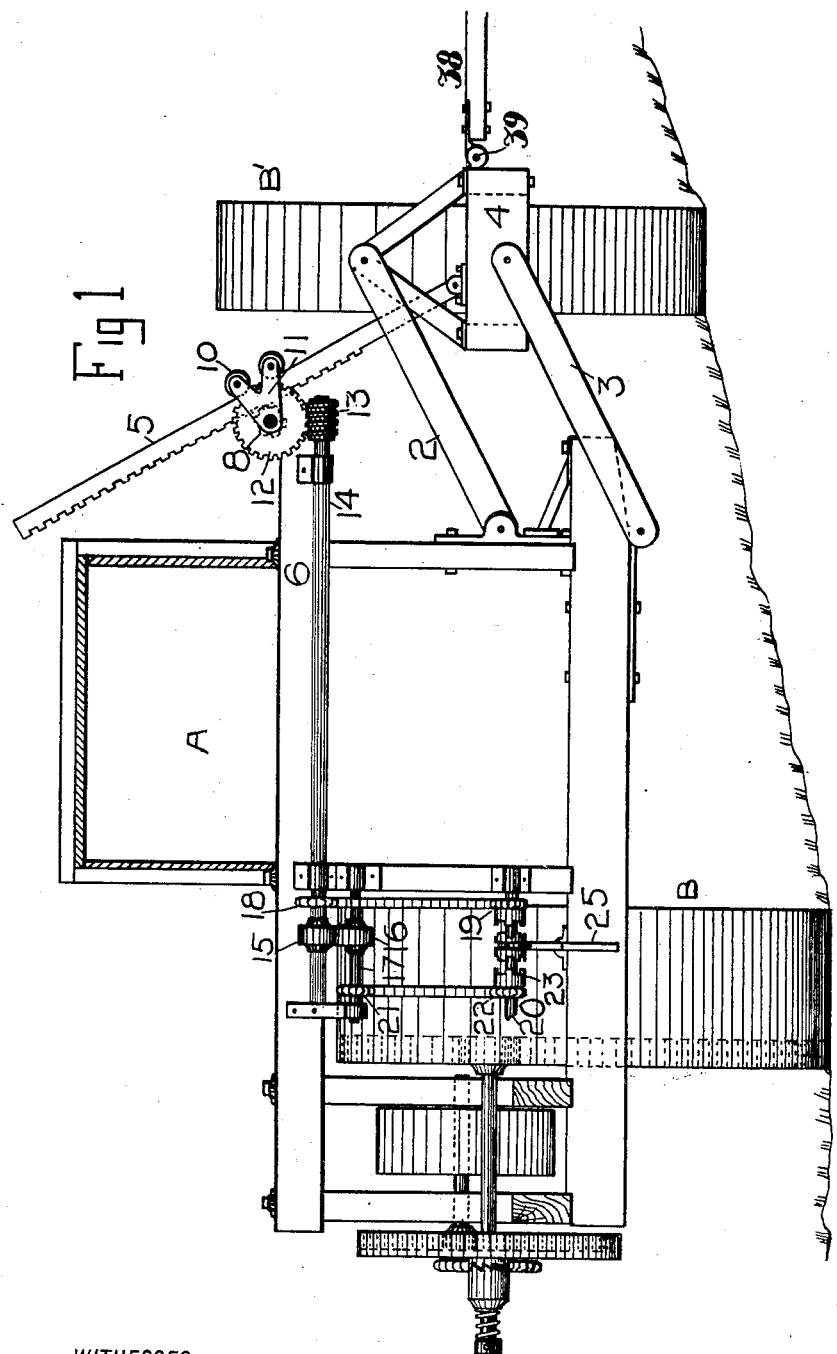

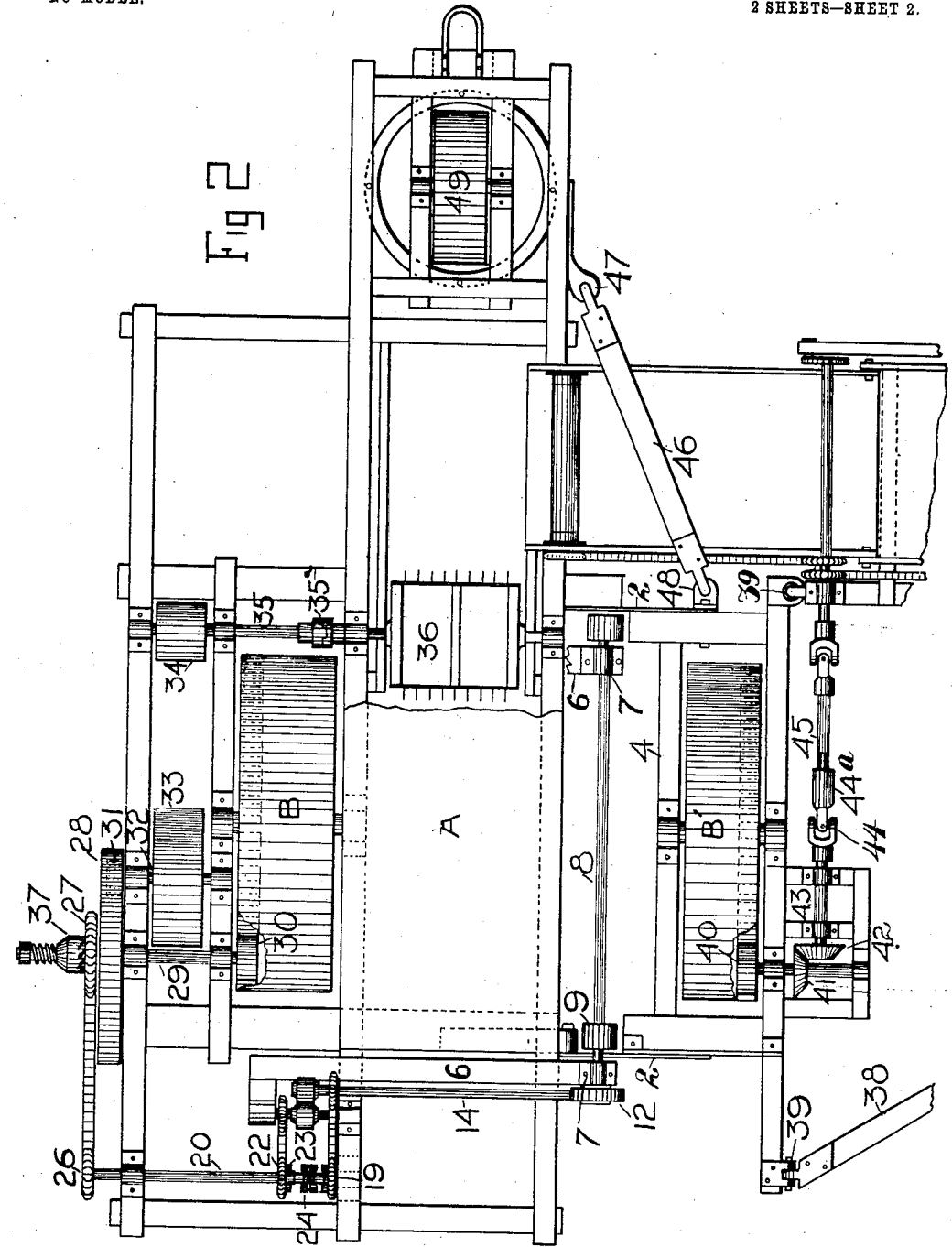

UNITED STATES PATENT OFFICE.

FRANKLIN S. HOLLEY, OF STOCKTON, CALIFORNIA.

TRAVELING HARVESTER.

SPECIFICATION forming part of Letters Patent No. 762,585, dated June 14, 1904.

Application filed January 28, 1904. Serial No. 190,963. (No model.)

*To all whom it may concern:*

Be it known that I, FRANKLIN S. HOLLEY, a citizen of the United States, residing at Stockton, in the county of San Joaquin and State of California, have invented new and useful Improvements in Traveling Harvesters, of which the following is a specification.

My invention relates to that class of harvesting machinery which is especially designed for cutting, threshing, and cleaning grain and in which the machine is mounted upon wheels and adapted to travel over the field in which the grain stands, being propelled either by animal or mechanical power.

My invention consists in a means for changing the position of one bearing-wheel relative to the other in such a manner that the threshing and cleaning mechanism of the apparatus may be maintained substantially level in a direction transverse to the line of travel and when the machine is traveling upon sidehills or inclined ground which would otherwise throw the said mechanism out of level.

It also comprises details of construction, which will be more fully explained by reference to the accompanying drawings, in which—

Figure 1 is a rear view showing rack to raise and depress the bearing-wheels, also reversing drive-gear for same. Fig. 2 is a plan of the apparatus.

It is the object of my invention to provide a means by which the main portion of the threshing and cleaning apparatus can be maintained approximately level whatever may be the slope of the hillside upon which the machine is traveling and to provide main bearing-wheels for said machine sufficiently widely separated to give transverse steadiness to the machine in all conditions under which it may be called upon to operate. This is effected as follows: The structure A, which carries the threshing and feed mechanism, means for transferring the threshed material to the cleaning-shoes, discharging the separated worthless straw, and transferring the partially-cleaned grain to sacks or to a second cleaner, is supported upon two bearing-wheels B and B'. The bearing-wheel B upon the left side of the machine looking toward the front is journaled upon a short shaft turnable in boxes upon an extension of the frame on that side of the casing which contains the operative parts previously mentioned. Upon the opposite or right side of this framework two sets of arms 2 and 3 are hinged or pivoted, so as to project outwardly from this frame, and at the outer ends these arms 2 and 3 are suitably connected with a frame 4, within which the wheel B' is journaled and turnable. This frame 4 is entirely independent of the main frame, except by the link connections 2 and 3 previously mentioned, and it is set at any suitable or desired distance upon the side of the machine, so as to give as wide a tread as may be desired for steadiness and for the work to be done.

The connections 2 and 3 may be of any suitable or desired material or form, and each pair of them is so connected as to operate like a parallel-ruler, having its pivots at each end substantially in vertical line. As shown in the present case, there are two pairs of these arms 2 and 3, one pair connecting with each end of the wheel-frame 4, and it will be manifest that when the wheel-frame 4 is raised or lowered the movement of the bars 2 and 3 about their pivot-pins will maintain this frame in its normal position and the wheel B' will remain in a vertical plane which is transverse to its axis, it being understood that the wheel B has no movement independent of its frame and the main portion A of the machine and that such adjustments as may be necessary to compensate for the position of the machine upon the sidehill are effected entirely by the movement of the wheel B'. In order to conveniently effect this movement, I have shown rack-bars 5, having the lower ends hinged to the frame 4. These bars extend upwardly at any desired angle or position with relation to the frame and to the main portion of the apparatus. As shown in the present case, the frame-timbers 6 project from the right side of the main portion of the structure, and upon these timbers are fixed journal-boxes 7, within which a shaft 8 is journaled and revoluble. Upon this shaft are pinions, as at 9, and these pinions are held in mesh with the teeth of the rack-gear by rollers 10, journaled in suitable supporting yokes or frames 11. These frames are supported by the shaft 8, which is turnable loosely through them, and the rollers 10 may be disposed in any suitable manner to retain the pinions and rack-bars in the desired mesh and with the least friction. It will thus be seen that by the revolution of the shaft 8 and its pinions in one direction the rack-bars will be advanced upwardly and the frame 4, which carries the bearing-wheel B, will be correspondingly raised, while the connecting arms or links 2 and 3 serve to maintain the frame in the position to keep the wheel from tilting materially to either side. It will be manifest that a revolution of the shaft 8 in the opposite direction will cause the pinions to move the racks downwardly, and thus depress the frame and wheel B', so that if this part be upon lower ground it may be depressed sufficiently to maintain the parts inclosed by the casing A in a horizontal position. The upward or downward movement of the wheel B' and its frame will manifestly cause these parts to move in a substantial arc of a circle of which the inner ends of the arms 2 and 3 are the centers, and any considerable rise or depression of this wheel will cause it to approach somewhat to the side of the machine. The pivoting of the rack-bars 5 and the free swiveling of the frames 11, carrying the antifriction-rollers 10, will allow them to compensate for all these movements and to maintain a proper relation with the pinions whatever change of angle of the bars may take place by the aforesaid movements.

Motion may be transmttted to the shaft 8 in various ways. I have in the present case shown a worm-wheel 12, fixed upon the shaft 8, and this engages with a worm 13, fixed upon a shaft 14, which is journaled transversely and may pass through the main casing A at any point which will prevent its interfering with the parts contained within said casing. In the present case I have shown it as substantially on the line with and parallel to the transverse timber 6 of the frame. Upon the opposite end of this shaft is a pinion 15, which meshes with a corresponding pinion 16 upon a counter-shaft 17, suitably journaled upon that side.

18 is a sprocket-wheel fixed upon the shaft 14, around which passes an endless sprocket-chain, and this passes around another wheel 19, fixed upon a shaft 20. The shaft 17 has also a sprocket-wheel 21, and a corresponding sprocket-wheel 22 on the shaft 20 serves, with the sprocket 21, to transmit the motion of an endless chain between these two sprockets. The sprockets 19 and 22 may turn freely upon the shaft 20, and each of them carries one member of a clutch of any suitable description, as at 23. Intermediate between these is another clutch member adapted to engage either of the clutch members 23, and this may be slidable upon a feather or polygonal portion of the shaft 20, movable by the usual clutch-lever, as indicated at 25, so that either of its ends may be thrown into mesh with its fellow member.

It will be manifest that the intermeshing of one of the clutches with its fellow will transmit motion to the sprocket-wheel 19 and through the chain and sprocket-wheel 18 will drive the shaft 14 in one direction, while the meshing of the other clutch will drive the sprocket-wheels 22 21 and the counter-shaft 17, and by means of the pinions 15 and 16 a reverse movement of the shaft 14 takes place. This device illustrates a form of apparatus which is well and commonly known to mechanics; but I do not wish to limit myself to this particular form of clutch mechanism or of device, since it is manifest that any well-known equivalent form of friction or other clutch or other mechanical contrivance may be equally well employed, the object being in any case to provide for a reversal of the movement of the shaft 14 and through it of the pinions and mechanism which raise and depress the wheel B'.

In order to drive the shaft 20, it is suitably journaled upon the frame and has connection with some moving part of the machinery. As shown in the present case for illustration, this shaft has a sprocket-wheel 26 fixed to it, and by means of an endless chain it is driven from the sprocket-wheel 27, fixed to and carried by the internal gear 28, mounted upon the shaft 29, and driven by a pinion 30, which meshes with an internal gear upon the bearing-wheel B; but it will be understood that any other arrangement of gear or transmitting mechanism may be employed in place of the one particularly here described. The internal gear-wheel 28 engages and drives a pinion, as at 31, this pinion being mounted upon a jack-shaft 32, carrying a pulley 33, from which by means of an intermediate belt motion is transmitted to the pulley 34, mounted upon a shaft 35, and through a suitable joint or connection 35ª this shaft serves to drive the threshing-cylinder 36. A spring-pressed automatically-acting clutch, as at 37, allows the internal gear 28 and the parts connecting it with the cylinder to continue their motion if the machine is stopped or if rate of speed is decreased, and thus the strain on the parts caused by the momentum of the heavy cylinder will be relieved.

The header-frame 38 may be of the usual or any desired construction and is hinged to the frame 4, as shown at 39, so that this header-frame, the outer end of which is carried upon a bearing-wheel in the usual manner, has a movement to adjust itself and its cutter-bar to the inequalities of the land independent of the movement of the wheel-frame 4 and the main portion of the machine. Thus by raising and depressing the wheel B' the main portion of the frame may be maintained approximately level with relation to the hillside, while the header portion has its own independent movement to maintain a substantial parallelism with the surface of the ground over which it is passing.

Various devices may be employed for transmitting motion from the bearing-wheel B' to drive the sickle and the draper or carrier belt which transmits the cut straw and grain from the header to the feed-hoist and threshing-cylinder of the main machine. I have here shown an internal gear carried by the bearing-wheel B' and a pinion 40 mounted upon a shaft and driven by the internal gear. The bevel-gear 41 upon this shaft engages a similar bevel-gear 42 upon the shaft 43 and by means of a universal joint, as at 44, motion is transmitted to a tumbling rod or shaft 45, through which motion is again transmitted to drive the crank by which the sickle-bar is reciprocated, and by means of suitable pulleys driven from this shaft a draper-belt may also be properly moved. A telescopic joint $44^a$, slidable on a feather on the tumbling-rod, compensates for variations in length.

In order to resist the throw and relieve the strain which will be brought upon the wheel-frame 4 by reason of the movement of its wheel over irregular and rough surfaces and by reason of other strains which will be brought upon it, I have shown a brace-rod, as at 46. This rod has one end loosely connected with the main longitudinal frame-timbers of the machine, as at 47, and the other end is similarly connected with the frame 4, as at 48. Both these joints are made sufficiently free to allow of the free movement of the wheel-frame with relation to the machine. In order to prevent any undue strain upon the joints or connections of this brace-bar, the joint at 47 is approximately in line with the joints of the parallel-motion levers 2 or 3, so that by any raising or lowering of the wheel B' the movement will be about an imaginary axis on the aforesaid line of connection. It will be manifest that this brace-rod may be varied in position to suit conditions, or that it may be duplicated, if found necessary or desirable, the object being in any case to maintain a sufficiently rigid connection between the independent wheel-frame 4 and the main frame of the machine to prevent an undue movement and strain of this wheel-frame with relation to the main frame.

The front end of the threshing-machine is carried upon the usual steering-wheel 49.

Having thus described my invention, what I claim, and desire to secure by Letters Patent, is—

1. A threshing and cleaning mechanism, bearing-wheels mounted upon shafts, one of said wheel-shafts being journaled in an independent frame, connections between said frame and the main frame and mechanism whereby said independent frame may be raised or depressed with relation to the main frame and its wheel maintained in a substantially vertical plane.

2. A traveling thresher and cleaner having one bearing-wheel shaft journaled upon the main frame, an independent frame upon the opposite side upon which the other bearing-wheel shaft is journaled, arms pivoted to the main and supplemental frames to produce a parallel motion whereby the supplemental frame and its wheel are maintained in a substantially vertical plane at all times and mechanism connecting the main and supplemental frames whereby the latter may be raised or depressed.

3. A traveling thresher having one bearing-wheel shaft journaled upon the main frame, a supplemental frame within which the other bearing-wheel shaft is journaled upon the opposite side of the machine, links or bars connecting said frame with the main frame in the form of a parallel-ruler, a shaft journaled upon the main frame, pinions carried by said shaft, rack-bars turnably connected with the supplemental frame and engaging said pinions and mechanism by which the pinion-shaft may be driven in either direction whereby the rack-bars are lengthened or shortened, and the supplemental frame and its wheel are depressed or raised without changing the normal plane of rotation.

4. A traveling thresher and cleaner having one main bearing-wheel journaled to the main frame, an independent frame within which the other bearing-wheel is journaled and turnable upon the opposite side of the machine, parallel-ruler connections between the main and supplemental frames, rack-bars having the lower ends pivoted or hinged to the supplemental frame, a shaft journaled upon the main frame having pinions engaging the teeth of the rack-bars, yokes or frames journaled upon the pinion-shaft, rollers carried by said frames and bearing against the backs of the rack-bars whereby the teeth of the bars and pinions are maintained in mesh, a reversing mechanism through which motion is transmitted to revolve the pinion-shaft in either direction whereby the supplemental wheel-frame may be raised or depressed with relation to the main frame.

5. A traveling thresher and cleaner having bearing-wheels upon opposite sides, an independent frame in which one of said bearing-wheels is journaled, parallel-ruler links or bars connecting the main and supplemental frames, rack-bars, pinions and mechanism whereby the rack-bars are moved to raise or depress the independent wheel-frame and maintain the wheel in substantially the same plane of rotation, and a brace-bar loosely connected at one end with the independent frame, and at the other end with the main frame substantially as described.

6. A threshing and cleaning machine having a bearing-wheel turnable in fixed relation with one side of the machine, a second bearing-wheel journaled in an independent frame upon the opposite side of the machine, parallel-ruler bars or links connecting the supplemental and main frames, rack-bars having one end connected with the independent frame, a shaft journaled upon the main frame and provided with pinions, said pinions engaging the teeth of the rack-bars, a worm-wheel fixed upon the pinion-shaft, a shaft transverse to the machine, a worm fixed upon the last-named shaft, a counter-shaft and pinions, a power-shaft and connections between said shaft and the transverse and counter shafts, and clutch mechanism whereby the movement of the power-shaft may be transmitted to move the rack-bars in either direction and raise or depress the independent wheel-frame.

7. The combination in a traveling harvester of a threshing and cleaning mechanism, a bearing-wheel having fixed journals at one side of the machine, a second bearing-wheel journaled in an independent frame, parallel-ruler links connecting said frame with the main frame whereby the independent frame and its wheel are capable of vertical motion without changing the plane of rotation of the wheel, rack-bars, pinions and connected mechanism whereby said independent wheel-frame may be raised or depressed, a header-frame having a bearing-wheel at the outer end and hinge or pivot connections between its inner end and the independent wheel-frame, mechanism whereby motion is transmitted from said independent wheel to drive the header-sickle and a brace-rod having one end connected with the independent wheel-frame and a loose connection between the other end and the main frame.

8. A traveling thresher and cleaner having the left bearing-wheel journaled upon the main frame, an independent bearing-wheel frame having parallel-ruler connections with the opposite side of the main frame, rack-bars pivoted to the independent frame, a pinion-shaft, pinions engaging said racks, and reversing mechanism for said pinion-shaft, and connections between said mechanism and the left bearing-wheel whereby the movable wheel is raised or depressed.

9. A traveling thresher and cleaner having one bearing-wheel journaled upon the main frame, an independent bearing-wheel frame movably connected with the opposite side of the main frame, mechanism by which said independent wheel-frame is raised or depressed, an internal gear upon the first-named bearing-wheel, a journaled shaft with a pinion engaging said bearing-wheel gear, a sprocket-wheel fixed to said pinion-shaft, and a chain connection between said sprocket and the reversing mechanism of the adjustable wheel.

10. A traveling thresher and cleaner having one bearing-wheel journaled upon the main frame at one side thereof, an independent bearing-wheel frame movably connected with the opposite side of the main frame, reversible mechanism by which said independent wheel-frame is raised or depressed, an internal gear upon the first-named bearing-wheel, a counter-shaft with a pinion engaging said bearing-wheel gear, a sprocket-and-chain connection between said counter-shaft and the reversing mechanism of the adjustable wheel, an internal gear carried by said counter-shaft, a jack-shaft with a pinion engaging said counter-shaft gear and a belt-pulley fixed to the jack-shaft, a second pulley upon the threshing-cylinder shaft and a belt connecting the two pulleys to transmit motion to the threshing-cylinder.

11. A traveling thresher and cleaner having one bearing-wheel journaled upon the main frame at one side thereof, an independent bearing-wheel and frame movably connected with the opposite side of the main frame, reversible mechanism by which said movable wheel and frame are raised or depressed with relation to the main frame, driving connections including a counter-shaft and mechanism by which it is driven by said bearing-wheel, a jack-shaft and means for driving it from the counter-shaft, a threshing-cylinder having its shaft journaled on the main frame, a shaft journaled in line with the threshing-cylinder shaft, a universal-joint connection between said shaft and the cylinder-shaft, and belt-pulleys upon said shaft and the jack-shaft to transmit motion to the cylinder.

12. A traveling thresher and cleaner having one bearing-wheel journaled upon the main frame at one side thereof, an extension-frame at the opposite side of the main frame and a bearing-wheel journaled in said extension-frame, one of said frames being vertically adjustable with relation to the other, a threshing-cylinder journaled on the main frame, a supplemental shaft journaled on the main frame in line with the threshing-cylinder shaft, a loose joint connection between said shafts, a jack-shaft journaled upon said main frame, pulleys upon the supplemental cylinder-shaft and the jack-shaft with connecting-belt, and mechanism located between the jack-shaft and the contiguous bearing-wheel, whereby power is transmitted to drive the cylinder.

13. A traveling harvester having one bearing-wheel shaft journaled at one side of the main frame, an independent bearing-wheel and frame, movably connected with the opposite side of the main frame, a header-frame, hinges by which said frame is connected with the independent wheel-frame, sickle and draper-belt driving mechanism mounted upon the header-frame, a shaft journaled on the independent wheel-frame approximately in line with the driving-shaft of the header-frame, and an intermediate tumbling-rod with universal-joint connections and means for adjusting its length to the movement of the wheel-frame and header-frame.

14. A traveling harvester having one bearing-wheel shaft journaled at one side of the main frame, an independent bearing-wheel and frame movably connected with the opposite side of the main frame, a header-frame, hinges by which it is connected with the independent wheel-frame sickle and draper-belt driving mechanism mounted upon the header-frame, a shaft journaled upon the independent wheel-frame, approximately in line with the driving-shaft of the header-frame, gears by which motion is transmitted to said shaft from the contiguous bearing-wheel, a tumbling-rod with universal-joint connections with the shafts at each end, and a telescopic slidable connection and feather, to compensate for variations caused by movements of the header and wheel frames.

In testimony whereof I have hereunto set my hand in presence of two subscribing witnesses.

FRANKLIN S. HOLLEY.

Witnesses:
S. H. NOURSE,
JESSIE C. BRODIE.